US010389847B1

(12) United States Patent
Crausaz

(10) Patent No.: US 10,389,847 B1
(45) Date of Patent: Aug. 20, 2019

(54) PROVISIONING RESOURCES IN A COMMUNICATIONS SYSTEM

(71) Applicant: SHORETEL, INC., Sunnyvale, CA (US)

(72) Inventor: Pascal R. Crausaz, Sunnyvale, CA (US)

(73) Assignee: Mitel Networks, Inc. DE (US)

( * ) Notice: Subject to any disclaimer, the term of this patent is extended or adjusted under 35 U.S.C. 154(b) by 795 days.

(21) Appl. No.: 14/757,990

(22) Filed: Dec. 23, 2015

(51) Int. Cl.
*G06F 15/173* (2006.01)
*H04L 29/08* (2006.01)

(52) U.S. Cl.
CPC ............ *H04L 67/327* (2013.01); *H04L 67/18* (2013.01)

(58) Field of Classification Search
CPC ..... H04L 47/70; H04L 41/0806; H04L 47/78; H04L 67/327
See application file for complete search history.

(56) References Cited

U.S. PATENT DOCUMENTS

| | | | | |
|---|---|---|---|---|
| 6,704,030 | B1 | 3/2004 | McDonald et al. | |
| 8,239,422 | B2 * | 8/2012 | Forsyth | H04L 61/1511 379/15.03 |
| 8,315,603 | B2 | 11/2012 | Virk | |
| 8,484,363 | B2 | 7/2013 | Brown et al. | |
| 8,572,375 | B2 | 10/2013 | Bishop et al. | |
| 8,001,532 | B1 | 12/2013 | Hamid | |
| 8,997,092 | B2 | 3/2015 | Gentile et al. | |
| 9,148,414 | B1 * | 9/2015 | Roth | H04L 63/08 |
| 9,509,625 | B2 * | 11/2016 | Hotes | H04L 41/0806 |
| 2007/0239842 | A1 * | 10/2007 | Knowles | H04L 67/125 709/217 |
| 2011/0055385 | A1 * | 3/2011 | Tung | G06F 9/5072 709/224 |
| 2011/0088003 | A1 | 4/2011 | Swink | |
| 2011/0158183 | A1 * | 6/2011 | Siegel | H04L 65/1016 370/329 |
| 2011/0197254 | A1 * | 8/2011 | Sallaka | G06F 21/6218 726/1 |

(Continued)

FOREIGN PATENT DOCUMENTS

| | | | |
|---|---|---|---|
| EP | 1070480 | A2 | 1/2001 |
| GB | 2 411 314 | A | 8/2005 |

(Continued)

OTHER PUBLICATIONS

European Search Report for Application No. 16002107.7-1853, dated Apr. 3, 2017.

(Continued)

*Primary Examiner* — Oanh Duong

(57) ABSTRACT

A computer-implemented method includes receiving, at a server, input data to initiate provisioning a resource. Provisioning data is sent to the resource to enable presentation of a given provisioning object at the resource. User data is also sent to a registered client to enable an interactive presentation of a plurality of provisioning objects, which includes the given provisioning object, with respect to the registered client. The method also includes associating the resource with the registered client in response to a user input selecting the given provisioning object from the plurality of provisioning objects.

19 Claims, 5 Drawing Sheets

(56) References Cited

U.S. PATENT DOCUMENTS

| | | | | |
|---|---|---|---|---|
| 2011/0320605 | A1* | 12/2011 | Kramer | H04L 41/0843 709/226 |
| 2013/0013462 | A1* | 1/2013 | Deng | G06F 9/5011 705/27.1 |
| 2013/0103847 | A1 | 4/2013 | Brown et al. | |
| 2014/0122674 | A1 | 5/2014 | Gray et al. | |
| 2014/0181504 | A1* | 6/2014 | Almahallawy | H04L 63/062 713/156 |
| 2015/0156601 | A1 | 6/2015 | Donnellan et al. | |
| 2016/0087956 | A1* | 3/2016 | Maheshwari | G06F 8/60 726/6 |
| 2017/0041189 | A1* | 2/2017 | Aswathanarayana | H04L 41/0806 |
| 2018/0115552 | A1* | 4/2018 | Kantubukta | H04L 63/10 |
| 2019/0052624 | A1* | 2/2019 | Maheshwari | G06F 8/60 |

FOREIGN PATENT DOCUMENTS

| | | | |
|---|---|---|---|
| WO | 9724983 | A2 | 7/1997 |
| WO | 2006037172 | A1 | 4/2006 |
| WO | 2013/177325 | A2 | 11/2013 |
| WO | 2015/102608 | A2 | 7/2015 |

OTHER PUBLICATIONS

Canadian Application No. 2,943,658, Filed Sep. 28, 2016, Title: "Provisioning Resources in a Communications System"; Canadian Office Action dated Jul. 25, 2017; Examiner: Chapman Wong, 4 pp.

* cited by examiner

PROVISIONING RESOURCES IN A COMMUNICATIONS SYSTEM

TECHNICAL FIELD

This disclosure relates generally to provisioning resources in a communications system.

BACKGROUND

Many companies seek to empower mobile workers by implementing enterprise-wide Unified Communications (UC). UC affords anytime and anywhere collaboration by providing employees access to real-time communications tools on any device. This brings tremendous advantage by increasing the speed of business, but also can increase complexity for information technology departments to integrate various devices into the UC system. This complexity can further increase when a portion or all of the UC system operates in a hosted cloud.

SUMMARY

This disclosure relates generally to detecting and provisioning a device in a communications system.

One example provides a computer-implemented method that includes receiving, at a server, input data to initiate provisioning a resource. Provisioning data is sent to the resource to enable presentation of a given provisioning object at the resource. User data is also sent to a registered client to enable an interactive presentation of a plurality of provisioning objects, which includes the given provisioning object, with respect to the registered client. The method also includes associating the resource with the registered client in response to a user input selecting the given provisioning object from the plurality of provisioning objects.

Another example provides a system that includes memory to store provisioning data that includes a plurality of provisioning objects. A provisioning control function is configured to send an unprovisioned resource a given provisioning object of function is configured to send an unprovisioned resource a given provisioning object of the plurality of provisioning objects in response to a provisioning request from the unprovisioned resource. The provisioning control function is configured to send a registered client, which is registered for operation within a communication system, the plurality of provisioning objects in response to a request from the registered client. The plurality of provisioning objects includes the given provisioning object. The provisioning control function is further configured to associate the unprovisioned resource with the registered client and provision the unprovisioned resource for operation within the communication system in response to client input data indicating that the given provisioning object has been selected at the registered client in response to a user input.

Another example provides a method of provisioning another resource in a unified communication system that includes a plurality of resources registered to respective user accounts. The method includes receiving a request to initiate provisioning of the other resource and sending provisioning data to the other resource to enable a user perceptible presentation of a given provisioning object at the other resource. The method also includes sending user data to a registered client, corresponding to one of the plurality of resources registered to a respective user account, the user data enabling an interactive presentation of a plurality of provisioning objects with respect to the registered client.

The plurality of provisioning objects includes the given provisioning object. The method also includes receiving selection data identifying one of the plurality of provisioning objects that has been selected in response to a user input at the registered client. The method also includes associating the other resource with the respective user account of the registered client and initiating provisioning of the other resource for operation within the communication system if the selection data identifies that the given provisioning object was selected in response to the user input at the registered client.

DETAILED DESCRIPTION

This disclosure relates to systems and methods for detecting and provisioning resources in a communication system. The communication system can be a single or multi tenant unified communication system in which respective users can have any number of one or more devices for communicating and performing various tither related functions within the UC system. The systems and methods disclosed herein facilitate provisioning new devices that may be added to the system for registered users. By way of example, a server, which can operate within a premised-based and/or a multi-tenant communication system, can be configured to control provisioning of resources. In response to a request from an unprovisioned resource, the server can send the resource a given provisioning object. For instance, each of any number of one or more unprovisioned resources can be provided with unique provisioning objects. In response to a request from a registered client, the server can also provide the registered client with a plurality of provisioning objects that are presented at the registered client, which provisioning objects include the given provisioning object. For instance, a user initiates the provision process at both the unprovisioned resource and the registered client, such as can be located near each other. The presentation of such objects by the registered client can include graphical and/or audible objects. The objects can be presented sequentially or collectively or as a subset thereof, such as may vary depending on the type and number of provisioning objects provided to the registered client.

A user can employ a corresponding user interface to select one (or more) of the plurality of provisioning objects presented. For instance, the user is to select which object matches the given object presented at the unprovisioned resource. By presenting multiple, the systems and methods can mitigate one user mistakenly or wrongly appropriating a device by selecting the incorrect object. Data identifying the selection from the registered client is sent to the server to ascertain whether the selected provisioning object matches the given object provided to the unprovisioned resource. In response to detecting a match, the server can then associate the unprovisioned resource with the registered client. For example, the association can update a configuration record associated with the user account of the registered client to include the unprovisioned resource. Once the association is made configuring and and registration of such resource can be implemented to provision the resource for operation within the communication system.

Figure 1:
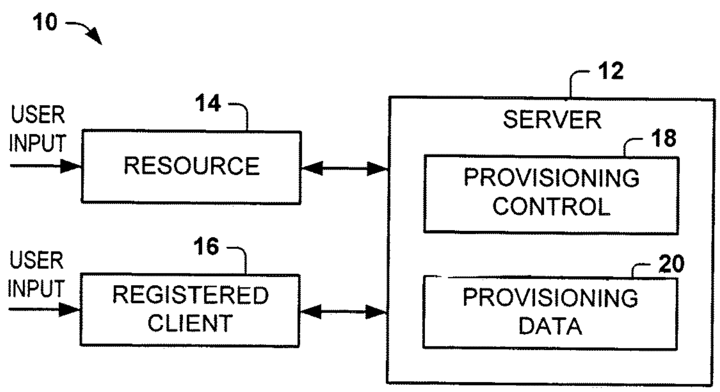
FIG. 1 depicts an example of a server configured to provision a resource in a communication system.

FIG. 1 depicts an example of a system 10 for provisioning resources for operation in a communication system. The communication system 10 can be a premised based system, a cloud based system or a hybrid premised and cloud based a unified communication (UC) system. The system 10 includes a server 12 configured to detect and control provisioning of resources in the system 10. The location of the server 12 can vary according to the type and configuration of the system 10. For example, the server can be local or remote with respect to one or more resources 14 and one or more registered clients 16.

For example, the resource 14 can include any type of device, hardware and/or software, that is to be provisioned for operation in the communication system 10. In various examples herein, for sake of consistency, the resource to be provisioned is referred to as being unprovisioned, although this does not require that the resource has not been provisioned (e.g., the resource can be reprovisioned if it already had been provisioned). The resource 14 can be implemented as a video phone, a soft phone, a desktop phone, a mobile device (e.g., cell phone or tablet computer), a projector or any other device that can implement a control application interlace corresponding to perform various provisioning functions disclosed herein. The registered client 16 similarly can be hardware and/or software, but is already registered for operation in the system 10, such as by a provisioning method as disclosed herein or otherwise. As an example, a registered client 16 can correspond to a unified communication client running on a computer that has been configured for operating in the system 10 for a given user account. For example, the registered client can be authenticated, such as by providing a username and password or other authentication methods. In this way, the registered client 16 is a trusted device operating within the system 10 and associated with a respective user account, which can include any number of client resources. Thus, the registered client 16 can communicate with the server 12 via a direct connection and/or via a messaging protocol that has been established therebetween. In the examples disclosed herein, the unprovisioned resource 14 and the registered client 16 are to be associated with a common user or user account of the communication system 10. Thus, it is presumed that the registered client and the resource 14 can be spatially co-located during provisioning.

The server 12 includes provisioning control 18 to control the provisioning process with respect to the resource 14 and the registered client 16. The provisioning control 18 can receive input data to initiate provisioning from the unprovisioned resource 14 as well as from the registered client 16. For example, the resource 14 can be preprogrammed with destination contact information (e.g., an email address, a telephone number, a uniform resource locator (URL) or the like) that has been established for communicating with the server 12. Thus, the resource 14 can send a request corresponding to the input data to initiate provisioning for the resource.

In response to the request, the provisioning control 18 can send provisioning data to the resource 14 to enable presentation of a given provisioning object at the resource. The provisioning control 18 can provide the given provisioning object as a unique object assigned (e.g., linked) to the resource to which it is provided. The provisioning object can be globally unique within the system 10 or it may be temporally unique within a period of time, such as a number of one or more hours, weeks, days or otherwise. In this way, if a provisioning object is sent out for provisioning multiple resources in the system 10 each of the provisioning objects will be unique relative to each other. Stated differently, by not including multiple 'in-use' provisioning objects at the same time provisioning errors and/or stealing of resources can be prevented.

The provisioning object provided to the resource 14 can be selected from a plurality of provisioning objects that can be stored in memory or selected from one or more resources via a network connection, demonstrated collectively as provisioning data 20. As used herein, the provisioning data 20 thus can represent any data that is received by and/or provided from the server or otherwise associated with the provisioning process, whether such data is local or remote with respect to the server 12.

The presentation of the provisioning object at the resource 14 can include a graphical display, an audio presentation or a combination of audio and graphical presentation. For example, the graphical presentation can be static or animated (e g., video), such shapes, pictures, clip art or other images, such as can be stored in local memory or be accessed from a remote location (e.g., a service). Additionally or alternatively, the graphical provisioning object displayed at the resource 14 can include colors, black and white, grayscale or otherwise provide a unique provisioning object. As another example, an audio presentation can include spoken words, letters, numbers, music or other sounds that can be presented via a speaker at the resource and/or client.

In response to activating provisioning at the registered client 16, the provisioning control 18 also provides the registered client with user data to enable an interactive presentation that includes a plurality of provisioning objects. For example, the provisioning control 18 can respond to a client-provisioning request by sending a set of provisioning objects selected from the provisioning data 20 to the registered client for display at the registered client. The set of provisioning objects provided to the registered client can be a full set of all available provisioning objects or a predetermined number thereof. The objects can be arranged in a predetermined or an arbitrary order. In some examples, the provisioning control 18 can select a proper subset (e.g., less than all) of available provisioning objects in the provisioning data and send the selected set of provisioning objects to the registered client as the user data. Regardless of the number or order, the plurality of provisioning objects in the user data provided to the registered client includes the given provisioning object that was provided to the resource 14. Additionally, to prevent erroneously associating multiple registered clients with the same resource, systems and methods herein each given provisioning object is only sent to a single resource during a given time period (e.g., each given provisioning object is globally or temporally unique).

It is understood at the time when the provisioning objects are sent to the registered client 16, the provisioning control 18 has not yet linked or otherwise associated the unprovisioned resource with the registered client or its user account in the communication system. The provisioning objects and user interaction thereof at the registered client 16 provide means for identifying and linking the unprovisioned resource with the registered client within the communication system.

As a further example, the resource 14 and registered client 16 both are co-located and in use (typically) by a respective authenticated user during provisioning. The resource 14 and the registered client 16 further can connect to the server via the same or a different network connection (e.g., wired and/or wireless) and provisioning can be initiated at the resource and client at or about the same time. In view of the totality of circumstances during provisioning, the provisioning control 18 can process the provisioning input received from each of the resource 14 and registered client 16 and correlate information elements that can be derived from the provisioning input request received from each. Based on the correlation, the provisioning control 18 can further limit and control the provisioning objects that are provided to the registered client 16 to facilitate selection of a matching provisional object. Additionally, the correlation can mitigate a voluntary incorrect provisioning input as well as involuntary incorrect provisioning input.

The registered client 16 includes a user interface (e.g., graphical user interface) that can be utilized to evaluate the provisioning objects and to enable user interaction and selection of the plurality of provisioning objects in response to a user input. In response to a user input for selecting a presented provisioning object, the registered client 16 provides the selection user input as selection data to the provisioning control via a corresponding connection. The selection data can specify a name for the provisioning object, include the provisioning object or other user input data, such as audio (e.g., user voice recording) and/or image (e.g., user image acquired via a camera). As mentioned, the connection can be a secure connection or a public connection or can involve both secure and public connections, which can vary depending upon the location of the client 16 with respect to the server 12. The provisioning control 18 compares the selected provisioning object with respect to the given provisioning object that was sent to the resource 14. If the selected provisioning object matches the given provisioning object, the provisioning control 18 associates the resource 14 with the registered client 16, such as by registering the resource as another authorized device (e.g., hardware and/or software) in the corresponding user account. In case of match failure (e.g., when the selected provisioning object does not match the given provisioning object), an updated new given provisioning object for the unprovisioned resource can be sent to mitigate its selection by simple deduction (e.g., multiple guesses).

The provisioning control 18 can store the association as part of the provisioning data 20 and/or in a configuration database for the communication system 10. Additionally, in response to verifying that the resource 14 is a trusted resource in response to matching selected provisioning object with the given object sent to the resource, the provisioning control 18 can implement further configuration and provisioning of the resource 14 such as to enable secure bi-directional communication between the resource and the server or other resources within the communication system 10. This can include providing the resource with additional software and application interfaces, providing router information and authentication information to provide for secure bi-directional communication between the resource and one or more other resources in the system 10.

While in the foregoing examples, a single provisioning object is disclosed as being sent to the resource 14, in other examples, multiple objects (e.g., graphical and/or audio objects) can be sent to the resource for presentation and matching with corresponding objects at the registered client 16, such as to afford increased security and to mitigate selection of an incorrect provisioning input. However, since the registered client 16 and its user are presumed to be trusted operators in the system 10, the more simple case of matching a single object should provide sufficient security under most circumstances.

Additionally or alternatively, depending on the capabilities of each the resource 14 being provisioned and the registered client 16, the provisioning control implemented by systems 10 could capture user inputs from both the resource and the client (e.g., audio and/or video) for provisioning the resource with respect to the client. For example, an unprovisioned telephone (e.g., desk or other phone) could be used by a user to provide a voiceprint to the system (e.g., recording of one or more words or a sentence provided to the telephone from the server 12). The same sentence could be recorded on the registered client and sent back to the server as user input data. The provisioning control can then analyze both units of recorded audio snippets and do a match. If the voiceprints match within a sufficient confidence level, the resource can be associated with the account of the registered client. In another example, where both devices include a camera, each of the resource 14 and registered client can take a picture of the users face and be sent as image data to the provisioning control for analysis and correlation and matching.

Figure 2:
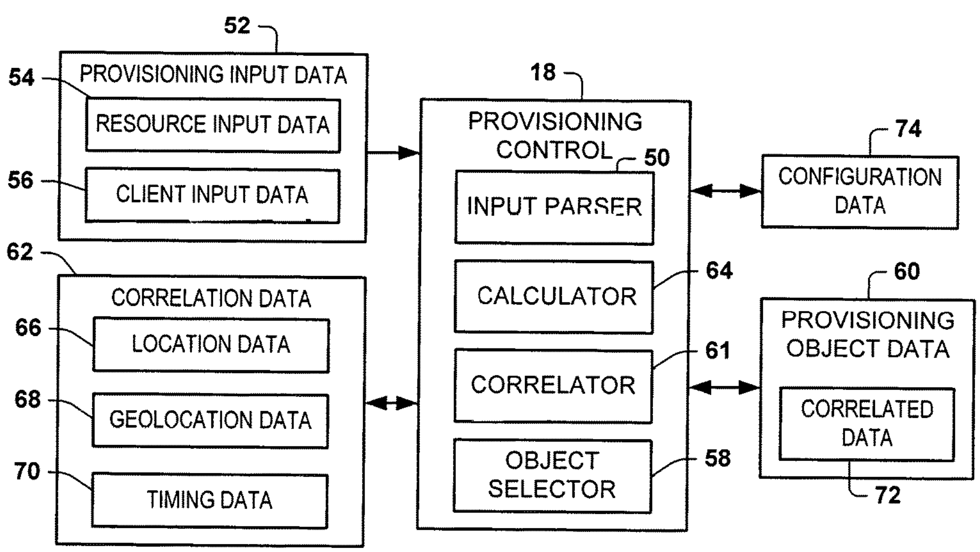
FIG. 2 depicts an example of provisioning control that can be implemented to provision resources in a communication system.
Figure 3A:
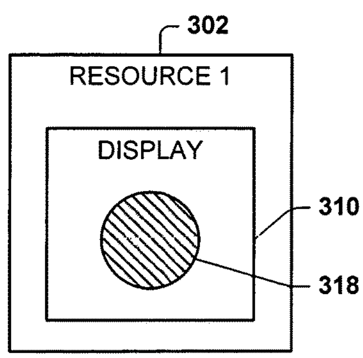
FIGS. 3A, 3B, 3C and 3D depict examples of provisioning objects that can be presented in various resources and devices in a communication system.
Figure 3B:
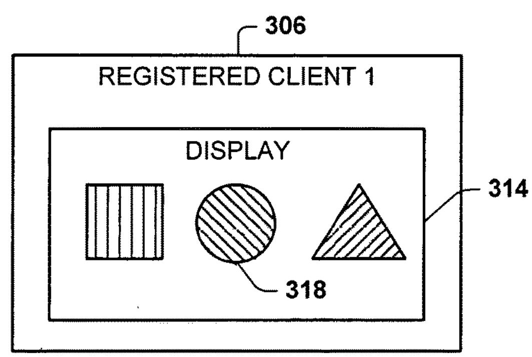
Figure 3C:
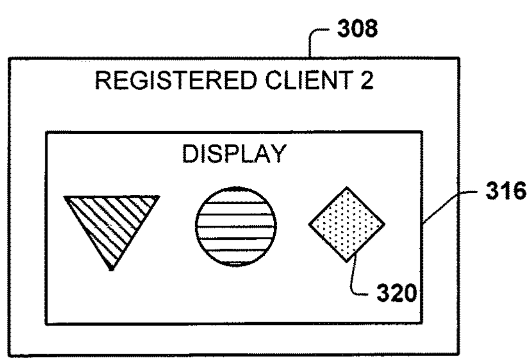
Figure 3D:
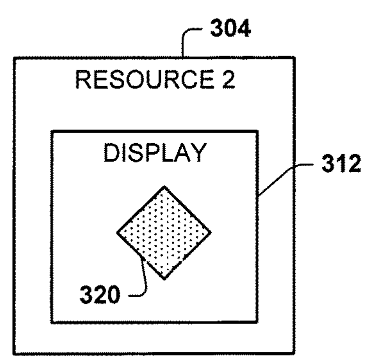

FIG. 2 depicts an example of the provisioning control 18 and examples of its functionality that can be utilized to implement the provisioning of resources in a communication system (e.g., the system 10). As disclosed herein, the provisioning control 18 can operate in a single enterprise system (e.g., system 350) or multi-tenant communication system (e.g., cloud-based multi-tenant system 400). The provisioning control 18 includes an input parser 50 to process and extract actionable information from provisioning input data 52. The provisioning input data 52 can include resource input data 54 that can be provided from one or more unprovisioned resources (e.g., resource 14) and client input data 56 that can be received from one or more registered clients (e.g., client 16).

The input data 52 can be received at a given IP address of a server (e.g., server 12) that has been provided to resources and clients a priori, such as can be preprogrammed in unprovisioned resources and clients. The location can be specific to provisioning control 18 or a server implementing the provisioning control, more generally, and the parser 50 can route the provisioning input data 52 to the provisioning control 18. As disclosed herein, the resource input data 54 that is provided by an unprovisioned resource can include or be treated as a request to initiate a provisioning process for the sender resource. For instance, the parser 50 can extract pertinent information from the message received from the unprovisioned resource, and in response to the extracted information, the provisioning control 18 can employ an object selector 58 to select one or more provisioning objects from corresponding provisioning object data 60. Similarly, the parser can extract the client input data 56 from a registered client's provisioning initiation request and provide the extracted data to provisioning control 18. The provisioning control 18 can employ the object selector 58 to select the plurality of provisioning objects from the provisioning object data 60 and provide them to the registered client as user data to enable interactive presentation of provisioning objects at such client that provided the provisioning initiation request.

The provisioning object data 60 can be stored in local or remote memory and include a multitude of different provisioning objects. As mentioned, the provisioning objects can include graphical objects and/or audio objects. The provisioning object data can include a static (e.g., fixed) or dynamic (e.g., variable) set of provisioning objects. A fixed set can remain fixed over time for use in provisioning resources in the communication system. In other examples, the provisioning data 60 can correspond to a dynamic set of objects, such as can be generated on the fly in response to a provisioning request or be updated over time to help ensure the uniqueness of the respective provisioning objects. In some examples, the object selector 58 selects the plurality of provisioning objects to maximize the probability of a match.

As mentioned, the provisioning input data 52 can include provisioning initiation request from any number of users. In a large enterprise system or a hosted system, there can be hundreds or even thousands of provisioning requests at any given time. Accordingly, the provisioning control 18 can implement a correlator 61 to correlate the provisioning input data 52 from unprovisioned resources and registered clients. The correlator 61, for example, can correlate provisioning requests based on correlation data 62 that can be derived from the provisioning input data 54 and 56. A calculator 64 can be programmed to derive and extract corresponding correlation data 62 from the respective input data 52. The calculator 64 can be implemented as part of the input parser 50, for example, to process the resource input data and the client input data received from the respective unprovisioned resources and registered clients, and then generate the correlation data 62.

In the example of FIG. 2, the correlation data 62 includes location data 66, geolocation data 68 and timing data 70. The location data 66 can correspond to a logical or physical location. The provisioning requests from a resource and registered client that may be physically co-located may originate from within a common network, which can be reflected in and/or derived from the senders' IP address or related routing information. A correlation between the unprovisioned resource and the registered client thus can be based on location, such as may include a physical location or logical location. For example, the parser 50 and calculator 64 can ascertain a logical location of the resource and client from location information provided in data 54 and 56 received from the resource and the registered client, such as by determining a subnet for each resource in an IP network. The subnet can specify a network or routing prefix and the rest field or host identifier, and the correlator 61 can analyze a set of most-significant bit-group in the IP address to ascertain which clients and resources belong to a common subnet. Consequently, if the unprovisioned resource and the registered client share a common subnet, the correlator 61 of provisioning control 18 can infer that the resource and client may be co-located within a common network. Based on this inference, the provisioning control can optimize the set of provisioning objects that is proposed to the registered client and the unprovisioned resource to facilitate a match.

As an example, the calculator 64 can implement a geolocation function to compute the geolocation data 68 representing a geographic spatial location of an object based upon the requests received from the unprovisioned resources and clients. The calculator can look up an IP address on a WHOIS service and retrieve a physical location (e.g., country, region, city, postal/zip code, latitude, longitude and time zone) for the IP address. Additionally or alternatively, geolocation information can be ascertained by other methods such as via GPS, RFID, a wireless beacon or the like. Additionally or alternatively, the calculator or input parser can extract timing information from each request. This can include the time the message was sent that can be embedded in the provisioning request from the resource and registered client and/or the time that the request is received by the server (e.g., server 12) implementing provisioning control 18. Such timing information can be stored as the timing data 70.

The correlator 61 thus can evaluate and compare the location data 66, geolocation data 68 and timing data 70 for requests from unprovisioned resources and from registered clients to infer common location and/or timing attributes for the resources and registered clients. The correlator 61 can utilize requests sharing common attributes to infer a likelihood of some association between respective pairs of resources and clients. The correlator 61 can implement various types of correlation functions and correlation coefficients can be computed based upon the correlation data 62 to calculate a statistical or other correlation between variables represented by the correlation data 62. The correlator can implement a correlation function (e.g., mutual information) that matches correlation data 62 provided with or derived from the resource and client input data 54 and 56. In other examples, statistical distributions and variances can be computed based upon analysis of the correlation data 62 for resource-client pairs. Because of such analytics, the correlator 61 generates a correlated set of provisioning objects stored as correlated data 72 in the provisioning object data 60. The correlated data 72 thus can represent a reduced subset of the available provisioning objects that can be provided to a particular registered client that having sufficient correlation with a respective non-provisioned resource.

In addition to or as an alternative from limiting the number of provisioning objects that are provided to a given registered client based upon the correlation data 62, the correlator 61 can organize some of the provisioning objects in the correlated data 72 such that the provisioning objects are ordered in a sequence based upon the level of correlation. For example, with a given registered client's request correlates the highest with a given unprovisioned resource, the provisioning object that was provided to the given non-provisioning resource will be the first provisioning object in the sequence of provisioning objects provided to such registered client.

In response to the provisioning request from the unprovisioned resource, the provisioning control sends the resource a given provisioning object for presentation at the resource. The presentation of the given object can be automated or activated for presentation in response to a user input. The type and level of interaction may vary depending on the mechanism used to communicate the given provisioning object. For example, if the provisioning object is sent to the resource in a text message or email message, a user may be required to open the message to present the object. As another example, the provisioning control can send a link to a web page to the unprovisioned resource, which can access and present the given provisioning object accordingly. The provisioning object data can be updated to specify that the given provisioning object has been sent to a respective unprovisioned resource, such as by tagging or adding metadata to the corresponding object data and/or record associated with such resource.

In response to provisioning request from the registered client and the resulting correlated data 72 that has been generated, the provisioning control 18 employs the object selector 58 to send a selected subset of correlated provisioning objects to the registered client. As mentioned, in other examples (e.g., in the absence of implementing correlator), the object selector 58 can send the (e.g., uncorrelated) set of provisioning objects to the registered client.

The provisioning objects are received and presented interactively at the registered client as to enable user interaction with and selection of registered objects. Thus, another item of information in the client input data 56 is a selection user input representing a provisioning object selected in response a user input at the registered client. The selection user input can be extracted (e.g., from a received message or direct connection with the registered client) by input parser 50 and utilized by the provisioning control 18 to ascertain whether the selected provisioning object matches the given provisioning object provided to a respective unprovisioned resource. If a matching function of provisioning control 18 determines that the selected provisioning object matches the given provisioning object provided to the unprovisioned respective resource, then the provisioning control can associate the unprovisioned resource with the registered client that provided such input. The provisioning control 18 can in turn store such association in configuration data 74. The provisioning control can in turn provide additional provisioning configuration information to the resource to enable operation as a registered device in the system, which can further be stored in the configuration data 74. For instance, a user/client record in a configuration database can be updated to specify the associated resource as an authorized device.

Additional configuration information can be communicated between the provisioning control 18 and the resource to enable the resource to operate as a registered device within the system. The exchange of configuration information can include resource settings and user data programmed for operation in the communication system, including user data specifying the various properties and associations of the user account to which both the registered client and newly associated resource belong.

FIGS. 3A, 3B, 3C and 3D demonstrate the examples of unprovisioned resources 302 and 304 and registered clients 306 and 308 that can operate concurrently within a communication system. For example, the resources 302 and 304 and clients 306 and 308 can operate concurrently in the same UC system or can operate concurrently within distinct enterprise systems (e.g., as tenants) of a multi-tenant cloud-based communication system.

In the example of FIGS. 3A-3D, each of the resources 302 and 304 includes a respective display 310 and 312 and clients 306 and 308 also include respective displays 314 and 316. Each of the resources 302 and 304 thus includes a respective provisioning object demonstrated as a graphical element of different types at 318 and 320. Similarly, as disclosed herein, the displays 314 and 316 of respective clients 306 and 308 include a plurality of provisioning objects displayed therein. In particular, the provisioning objects presented in the display 314 include the given provisioning object 318 that is provided to the resource 302 and is presented in the display 310. Similarly, the display 316 of registered client 308 includes the provisioning object 320 that was provided to resource 304 and is currently presented in its display. While for ease of explanation, the outputs of the resources 302 and 304 and clients 306 and 308 are demonstrated as displays, other types of outputs could be utilized to present provisioning objects (e.g., audio and/or video) depending on the format and capabilities of the resources and clients.

The displays 314 and 316 of the registered clients 306 and 308, respectively, can be interactive displays responsive to user inputs for selecting from the provisioning objects presented therein (e.g., via user input device, such as touch screen, mouse, keyboard or hand gesture). The respective displayed objects in the clients thus can be selected in response to a user input and the corresponding selection can be provided to the provisioning control (e.g., provisioning control 18) as client input data (input data 56). While the foregoing examples of 3A-3D describes the presented objects in the form of graphical shapes having different colors or cross-hatching, it is understood that any form of graphical objects could have been used, such as clipart or images from other image databases (e.g., digital photos from user accounts). Additionally or alternatively, other provisioning objects that may not involve graphical objects could also be utilized including words, number, a combination of letters and symbols, audio snippets or the like. As disclosed herein, the type or types of provisioning objects sent to the resources and clients can vary depending on the capabilities of each respective client and resource. Additionally, in some examples, each registered resource 302 and 304 displays a unique resource provisioning object to avoid simultaneous use of any provisioning object in a given provisioning object set.

Figure 4:
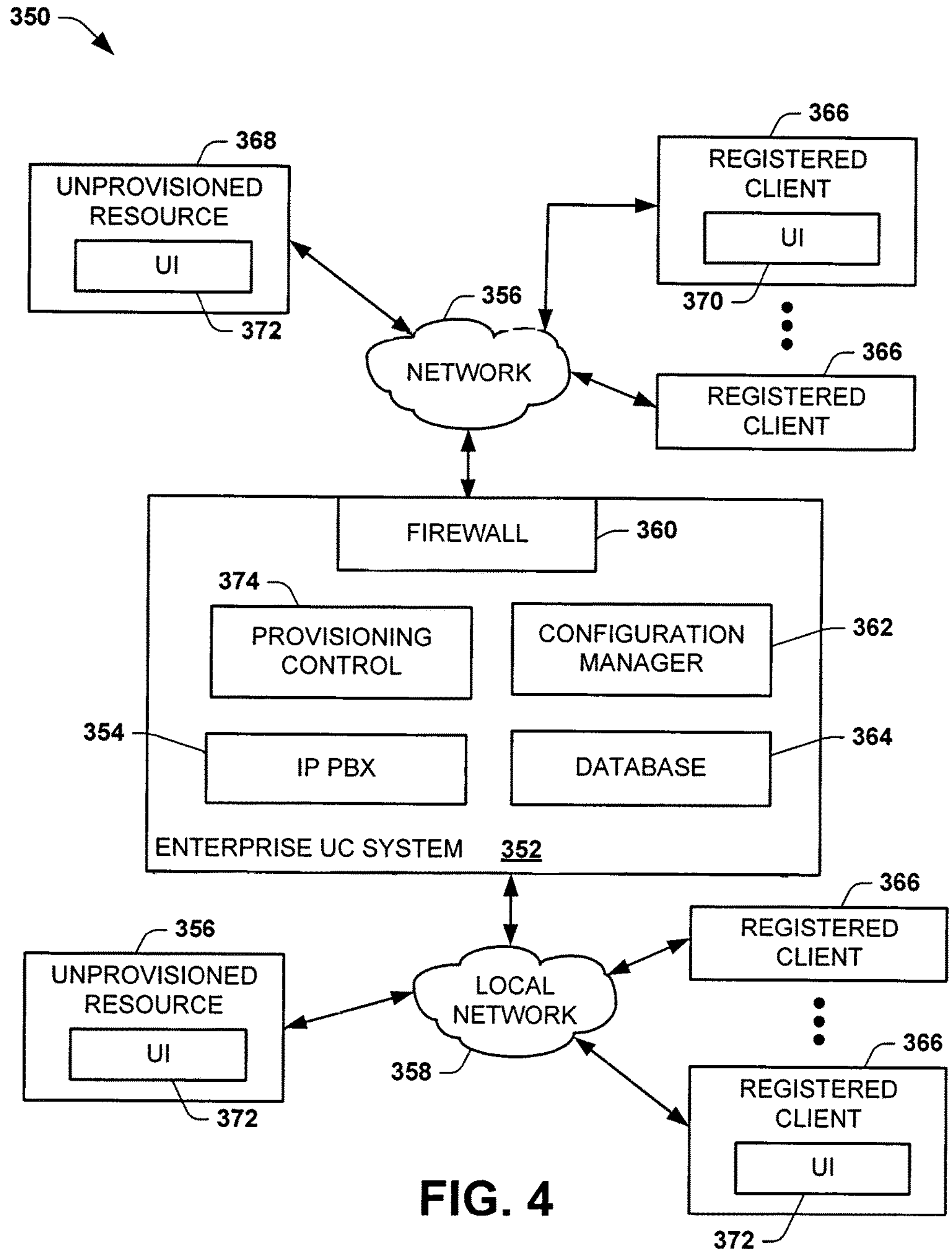
FIG. 4 depicts an example of a premise based communication system that can implement provisioning.

FIG. 4 depicts an example of a communication system 350. The communication system 350 includes an enterprise UC system 352 that can implement a variety of resources for implementing communications, including a private branch exchange (PBX) 354. The PBX 354 provides a communications exchange that services a particular entity corresponding to the premises (e.g., a business that may include one or more offices). This is in contrast to a common carrier (e.g., telephone service provider) that operates for many businesses or for the general public. For instance, the PBX 354 can communicate with a service provider or access a public switched telephone network (PSTN), such as via a network 356. Thus, the PBX 354 can include a hardware (e.g., switches, logic lines, routers, conferencing systems, and other controls) and software configured to couple to the network 356 for sending and receiving communications to and from the enterprise UC system 352 as well as for routing, distributing and managing communications within the premises based system such as via a local network. The PBX 354 can be configured to implement packet switched calls, such as implementing voice over internet protocol (VoIP), circuit switched calls or a combination of packet and circuit switched communications.

The enterprise UC system 352 can be connected to the network 356 via a firewall 360 to control the incoming and outgoing communications traffic by analyzing the data packets and determining whether or not they should be allowed through, such as based on a programmable rule set. The enterprise UC system 352 also includes a configuration manager 362 to control and configure various resource objects for operation as part of the and within the enterprise UC system. While in the example of FIG. 4 the configuration manager 362 is depicted as separate from the PBX 354, it could be implemented (in whole or in part) within the PBX. For example, the configuration manager 362 can include a graphical user interface programmed to access functions and methods to configure and manage the various components of the enterprise UC system 352.

Configuration data and operating parameters for the enterprise UC system 352, including its resource objects and associated user accounts, can be stored in a database 364. Resource objects can include hardware and/or software operating in the system 350, including control methods and services within the enterprise UC system 352 as well as registered clients 366 and as yet unprovisioned resources 368. Each of the registered clients 366 and unprovisioned resources 368 includes a user interface 370, 372 that can be utilized to implement provisioning functions as disclosed herein. The type of user interface can vary according to the type and capabilities of the device. The user interface at each unprovisioned resource 368 can be utilized, for example, to initiate provisioning and thereby send a user-initiated request to provisioning control 374 of the UC system 352. The provisioning control 374 can implement functions and methods as disclosed herein (e.g., with respect to provisioning control 18 of FIGS. 1 and/or 2 and method 500 of FIG. 6).

By way of example, the provisioning control 374 can receive provisioning input data from an unprovisioned resource 368 to initiate provisioning of the resource. The provisioning control 374 can also receive provisioning input data from one or more registered clients in response to a user input, such as via a provisioning API configured to access the provisioning control. The provisioning control 374 selects and sends provisioning data to the unprovisioned resource to enable presentation of a given provisioning object at the resource. The provisioning control also sends user data to the registered client that initiated the provisioning function. The user data enables interactive presentation of a plurality of provisioning objects the registered client to which it is sent, including the given provisioning object sent to the unprovisioned resource. A user can select a provisioning object from the set of objects presented at the registered client 366 and provide a corresponding user selection input to the provisioning control. The provisioning control 374 can then associate the unprovisioned resource 368 with the registered client 366 in response to determining that the user selection matches the given provisioning object. The provisioning control 374 can complete the provisioning process, including sending configuration information to the resource and updating the database, such as disclosed herein.

Figure 5:
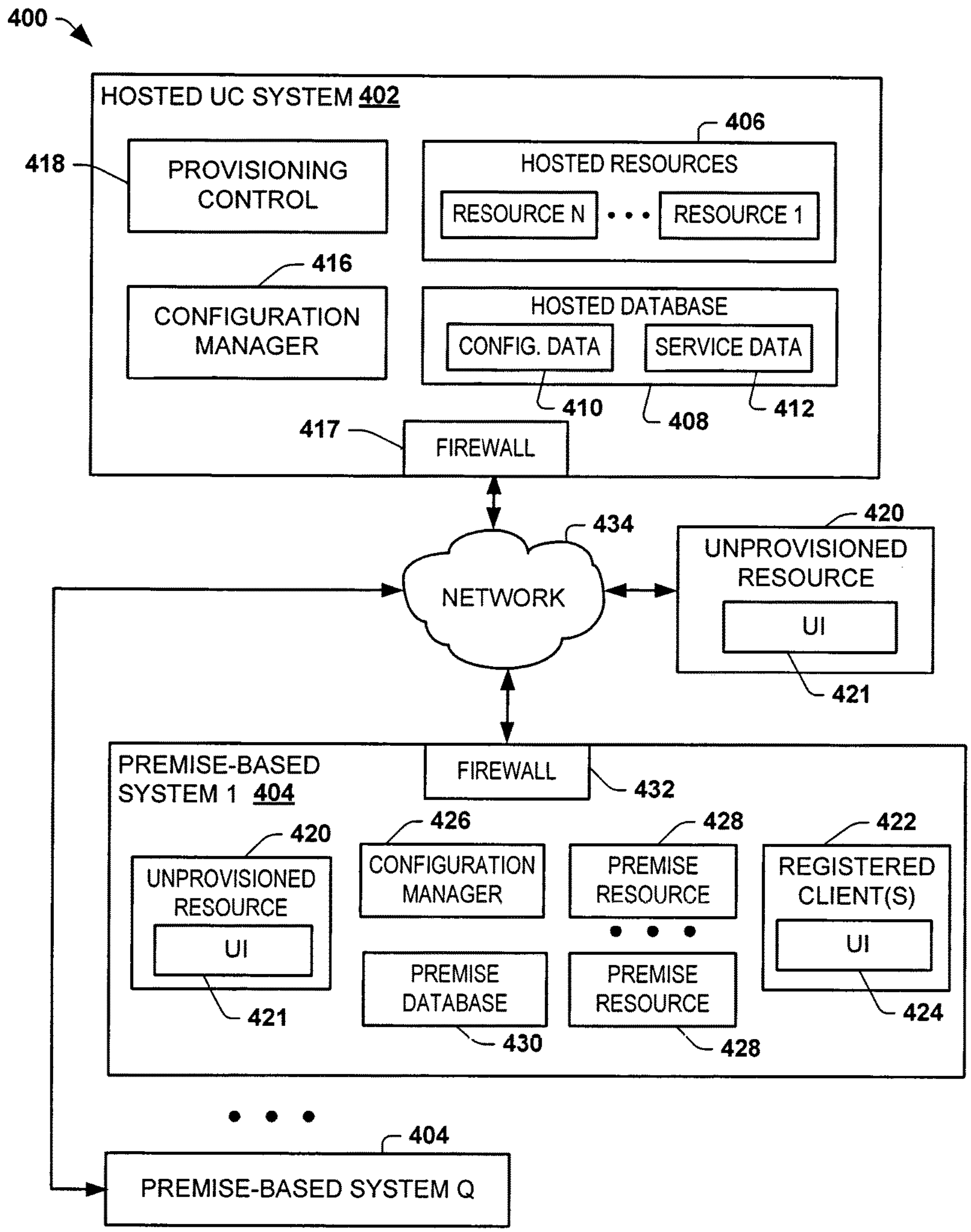
FIG. 5 depicts an example of a hosted unified communication system implementing provisioning for a plurality of communication systems.

FIG. 5 depicts an example of a multi-tenant hosted communication system 400. The system 400 includes a hosted system 402 and a plurality of premise-based systems 404. The system 400 can include any number Q premise-based systems 404 (Q being a positive integer). In the context of a multi-tenant communication system, each premise-based system 404 refers to a private network that is administered and/or operated by or on behalf of a private entity (e.g., a company, group of users, or other service provider) that is different from the entity operating the hosted UC system 402. The premise-based system 404 can be implemented locally at a single site or it can be distributed across multiple sites but operated as a single enterprise, such as an enterprise unified communication (UC) system. Each of the premise-based systems 404 can operate as a hybrid (partially cloud-based and partially premise based) system, a pure premise-based system or as cloud-based systems.

The hosted UC system 402 implements hosted (e.g., cloud-based) resources 406 for the premises based systems 404. With a minimal amount of setup, users or other entities that are generally administered and based at the premises can take advantage of specific cloud based services for which they have been authorized. In this way, local resources of the premises based system 404 can remain in a given state or condition, and users of such premises system can employ a network connection (e.g., via a secure communications link) with remote hosted resources (e.g., services and/or hardware implemented in a multi-tenant cloud) to access and utilize, seamlessly, additional resources (e.g., cloud resources) 406. For example, the hosted resources 406 can include different yet complimentary resources from those implemented within the premises based system and/or the resources can be duplicative (e.g., redundant or backup resources) to those in the premises based system such as to increase capacity of those in the premises based system.

The hosted system includes a hosted database 408 that includes configuration data 410 and service data 412 for each of the premise-based systems 404. The configuration data 410 for each premise-based system 404 can include a list of users and associated profile data for each respective user. For example, the local configuration manager 414 can employ an interface to send such configuration data for each of the respective local users to the hosted system as well as to retrieve account enable data for the hosted resources 406. The hosted system also includes a host configuration manager 416 to receive and process the local configuration data from the premise-based systems. The host configuration manager 416 is programmed to establish and manage an account for each of the premises based systems 404. The host configuration manager 416 can generate credentials and for each tenant account for use in establishing and control access to hosted resources 406. Data associated with the given account can be stored in the database 408 such as part of the configuration data 410. Usage by each of the premise-based systems 404 of the hosted resources 406 can be stored in the service data 412. The service data 412 can in turn be tracked for billing services depending upon subscription and other ways in which the premises based system contracts for use of the hosted resources 406. The hosted UC system 402 can be connected to a network 434 via a firewall 417.

In the example of FIG. 5, the hosted system 402 also includes provisioning control 418 to implement provisioning with respect to unprovisioned resources 420 that may be implemented in a plurality of different premise-based systems. In other examples, the provisioning control could be implemented with respect to each premise-based system separately or such functionality may be distributed between the hosted system 402 and the premise-based systems.

Each unprovisioned resource 420 can include a user interface (e.g., a passive or interactive display, such as GUI responsive to inputs via a touch screen, keypad or the like) 421. The user interface 421 can be used to initiate is provisioning in the system 400 in response to a user input as well as to implement other interactive other functionality at the resource. Since the system 400 is multi-tenant and thus includes a plurality of premise-based systems 404, the provisioning control 418 can provision resources across different premise-based systems. Such provisioning occur concurrently or a different times in response to initiating provisioning of resources. That is, the provisioning of such resources 420 is non-deterministic across the system 400. The provisioning control 418 can implement functions and methods as disclosed herein (e.g., with respect to provisioning control 18 of FIGS. 1 and/or 2 and method 500 of FIG. 6).

In the multi-tenant system 400, there is a greater likelihood of the hosted provisioning control 418 concurrently provisioning numerous different unprovisioned resources 420, with each unprovisioned resource receiving a given provisioning object. Additionally, the provisioning control sends a plurality of different provisioning objects to each of the registered clients 422 that has also initiated provision via its user interface 424, such as using a provisioning API to provide a provisioning activation request to the provisioning control 418. The set of provisioning objects can include a common set provided to each registered client 422 or each set can be a reduced set that has been correlated with respect to one or more unprovisioned resources, such as disclosed herein.

Each premises based system 404 can include a configuration manager 426 configured to provision the premises based system. The configuration manager 426, for example, can set parameters for a plurality of clients 422 as well as premise resources 428 that can operate within the premises based system, which parameters can be stored in a premise database 430. In addition to user parameters, in some examples, other configuration data in the database 430 can specify settings for users and premise resources 428. The types and extent of parameters for the premises based system 404 can vary depending on the available premise-based features (if any), equipment and software running in the premises based system and hosted resources in the hosted system 402, such as disclosed herein.

The premises based system 404 can be connected to a network 434 via a firewall 432 to control the incoming and outgoing communications traffic by analyzing the data packets and determining whether or not they should be allowed through, such as based on a programmable rule set. The premises based system 404 thus can be connected to the hosted UC system 402 via the network 434 to implement a variety of the hosted resources 406. Each premise-based system thus can establish a private intranet to provide for communications between premise resources 428 and clients 422. While demonstrated for sake of simplicity within the premise-based system 404, one or more registered clients 422 as well as the unprovisioned resource 420 could also reside outside of the firewall 432.

Figure 6:
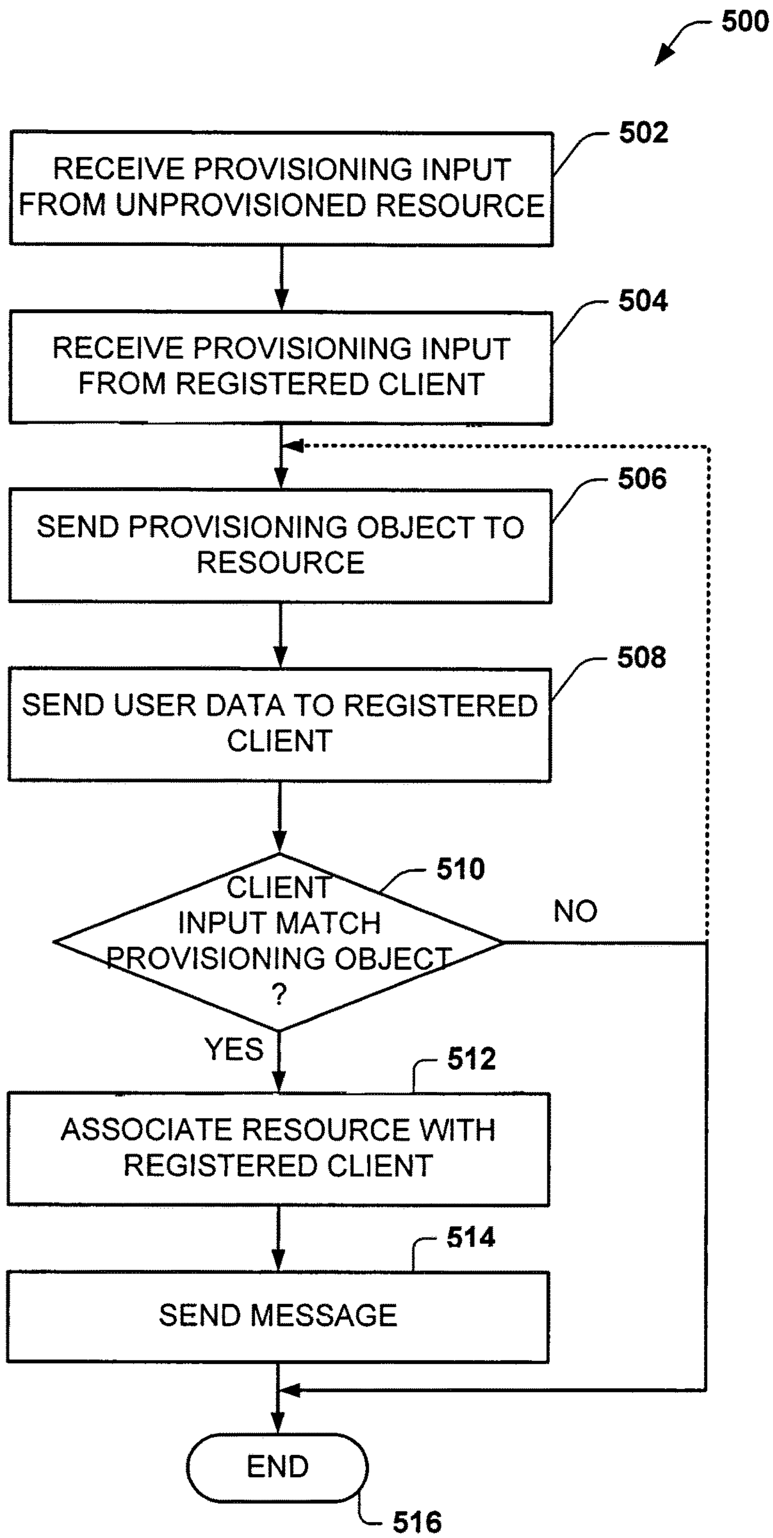
FIG. 6 is a flow diagram depicting an example method for provisioning resources in a communication system.

In view of the foregoing structural and functional features described above, an example method 500 will be better appreciated with reference to FIG. 6. While, for the purposes of simplicity of explanation, the example method 500 of FIG. 6 is shown and described as executing serially, the present examples are not limited by the illustrated order, as some actions could, in other examples, occur in different orders and/or concurrently from that shown and described herein. Moreover, it is not necessary that all described actions be performed to implement a method. The method 500 can be stored in one or more non-transitory computer-readable media and executed by one or more processing resources, such as disclosed herein. The method 500 can be implemented on a computer locally or remotely via a network connection.

The method 500 can correspond to actions implemented by the provisioning control, such as implemented at a server within a communication system, as disclosed herein. At 502, the method includes receiving a provisioning input from an unprovisioned resource (e.g., resource 14, 368 or 420). At 504, another provisioning input is received from a registered client (e.g., client 16, 366 or 422) to initiate provisioning. As mentioned, since the registered client is already registered and provisioned for operation in the system, it can implement an API to facilitate communication of data and instructions between provisioning control and the client. The registered client thus can also represent a source of truth that can be relied upon for provisioning the resource.

At 506, a given provisioning object is sent to the unprovisioned resource. A record can be stored in memory to associate or link the given provisioning object with the unprovisioned resource. At 508, user data is sent to the registered client. The user data can enable an interactive presentation of a plurality of provisioning objects with respect to the client. As disclosed herein, to mitigate errors the user data that is sent to the registered client can include a unique provisioning object that is also sent to only one unprovisioned resource. The presentation can be an automated presentation or be responsive to a user input (e.g., selecting a link or opening a file). The plurality of provisioning objects includes the given provisioning object. Thus, user can be presented the given provisioning object at the resource and the plurality objects at the registered client. The provisioning objects may be a set of objects based on a correlation from the provisioning requests received at 502 and 504. For example, the registered client can include or otherwise can control an output (e.g., a display and/or speaker) for presenting the provisioning objects to a user. The registered client can also include a user interface to provide a user input for providing selection data. The For instance, the user interface can be used to select one or more of the provisioning objects in response to a user input. Alternatively or additionally, the user interface can be utilized to provide the selection data include other types of information in response to a user input, such as audio (e.g., user voice recording) and/or image (e.g., user image acquired via a camera). In response to the user input at the client, corresponding selection data is received (e.g., at the provisioning control).

At 510, a determination is made as to whether the selection data matches the given provision object. When multiple given provisioning objects are provided to different unprovisioned resources, the determination at 510 evaluate whether the selection matches any given provisioning object that has been sent to an unprovisioned resource. If the client selection matches the given provisioning object, the method proceeds to 512. At 512, the unprovisioned resource is associated with the registered client. Further provisioning and registration of the resource to operate (e.g., as an authorized device) within the communication system can then be implemented, such as disclosed herein. At 514, as part of such provisioning a message can be sent to inform one or both the registered client and resource that provisioning is proceeding. Alternatively or additionally, the message at 514 can be provided after the resource provisioning has been completed. The method can end at 516.

If the client selection of a provisioning object fails to match the given provisioning object, the method can proceed to end at 516. Alternatively, as indicated by a dotted line, the method can return to 506 to send an updated, new given provisioning object to the resource. At 508, updated user data is also sent to the registered client. Such user data can include a message indicating the selection did not match and/or result in the same or another plurality of provisioning objects being provided to the registered client, which may be further correlated as disclosed herein as well as updated set of provisioning objects. Additionally, the user can thus be afforded another opportunity to select the given object from the plurality of objects being presented.

As can be appreciated by those skilled in the art, portions of the invention may be embodied as a method, data processing system, or computer program product (e.g., a non-transitory computer readable medium having instructions executable by a processor). Accordingly, these portions of the invention may take the form of an entirely hardware embodiment, an entirely software embodiment, or an embodiment combining software and hardware. Furthermore, portions of the invention may be a computer program product on a computer-usable storage medium having computer readable program code on the medium. Any suitable non-transitory computer-readable medium may be utilized including, but not limited to, static and dynamic storage devices, hard disks, optical storage devices, and magnetic storage devices.

Certain embodiments are disclosed herein with reference to flowchart illustrations of methods, systems, and computer program products. It can be understood that blocks of the illustrations, and combinations of blocks in the illustrations, can be implemented by computer-executable instructions. These computer-executable instructions may be provided to one or more processor cores of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in a non-transitory computer-readable medium that can direct a computer or other programmable data processing apparatus (e.g., one or more processing core) to function in a particular manner, such that the instructions stored in the computer-readable medium result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks or the associated description.

What have been described above are examples. It is, of course, not possible to describe every conceivable combination of components or methodologies, but one of ordinary skill in the art will recognize that many further combinations and permutations are possible. For example, while some examples disclosed herein may seem to describe a primarily premises-based system that can leverage a hosted deployment of resources, the systems and methods disclosed herein can employ various combinations of differing amounts of hosted and premises-based resources according to user requirements. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A computer-implemented method comprising:

receiving, at a server, input data to initiate provisioning of an unprovisioned resource;

sending, by the server, provisioning data to the unprovisioned resource to enable presentation of a given provisioning object at the unprovisioned resource;

sending, by the server, user data to a registered client to enable an interactive presentation of a plurality of provisioning objects, which includes the given provisioning object, with respect to the registered client, the registered client being pre-associated with a registered user account that is independent from the unprovisioned resource prior to associating the unprovisioned resource with the registered client;

associating, by the server, the unprovisioned resource with the registered user account in response to a user input at the registered client selecting the given provisioning object from the plurality of provisioning objects.

2. The method of claim 1, wherein the unprovisioned resource and the registered client are implemented within a unified communications system that includes the server.

3. The method of claim 1, wherein the server is configured to control resources by a plurality of users operating in a multi-tenant hosted system.

4. The method of claim 1, wherein the given provisioning object represents a substantially unique version of a user perceptible object.

5. The method of claim 4, wherein the user perceptible object includes at least one of an image or audio.

6. The method of claim 1, wherein the server provides a plurality of unique given provisioning objects, each associated with a different respective one of a plurality of different unprovisioned resources being provisioned in response to initiating provisioning thereof during a time window.

7. The method of claim 1, wherein the registered client to which the user data is sent is identified in response to a user input request to initiate provisioning at the registered client for another unassociated unprovisioned resource to be associated with the registered client.

8. The method of claim 1, wherein prior to sending the user data to the registered client, the method further comprising:

selecting a subset of the plurality of provisioning objects based on a correlation of information from each of the unprovisioned resource and the registered client.

9. The method of claim 8, further comprising computing correlation data based on the input data from the unprovisioned resource and a provisioning request from the registered client, the computed correlation data including at least one of location data, geolocation data and timing data.

10. The method of claim 9, wherein selecting the subset of the plurality of provisioning objects further comprises selecting the subset of the plurality of provisioning objects based on the computed correlation data, the server sending the registered client the subset of the plurality of provisioning objects in response to the provisioning request from the registered client.

11. The method of claim 1, further comprising, in response to a request from the registered client, sending additional user data to the registered client to enable an interactive representation of another plurality of objects with respect to the registered client.

12. A computer program product comprising:

at least one non-transitory machine readable memory having recorded thereon provisioning data that includes a plurality of provisioning objects and instructions executable by at least one processor configured to access the memory and execute the instructions, the instructions comprising a provisioning control function configured to:

send an unprovisioned resource a given provisioning object of the plurality of provisioning objects in response to a provisioning request from the unprovisioned resource, send a registered client, which is pre-associated with a registered user account that is independent from the unprovisioned resource prior to associating the unprovisioned resource with the registered client, a plurality of selected provisioning objects including the given provisioning object in response to a request from the registered client, and provision the unprovisioned resource for operation within a communication system in response to client input data indicating that the given provisioning object has been selected at the registered client in response to a user input at the registered client.

13. The computer program product of claim 12, wherein the provisioning control function further comprises:

an input parser to extract information from the provisioning request from the unprovisioned resource and the provisioning request from the registered client; and a correlator to select a subset of the plurality of provisioning objects based on correlation of the extracted information from each of the unprovisioned resource and the registered client.

14. The computer program product of claim 13, wherein the provisioning control function further comprises a calculator to compute correlation data based on the extracted information from the provisioning request from the unprovisioned resource and the provisioning request from the registered client, the correlation data including at least one of location data, geolocation data and timing data.

15. The computer program product of claim 14, wherein the provisioning control function further comprises an object selector to select the subset of the plurality of provisioning objects based on the correlation data, wherein the server sends the registered client the subset of the plurality of provisioning objects in response to the provisioning request from the registered client.

16. The computer program product of claim 12, wherein the system is a multi-tenant unified communication system, the provisioning control function being implemented in at least one of a hosted system or a premise-based system.

17. The computer program product of claim 12, wherein each of the plurality of provisioning objects represents a substantially unique version of a user perceptible object.

18. The computer program product of claim 12, wherein the registered client further comprises an application interface to communicate with the provisioning control function and provide the provisioning request and the client input data.

19. One or more non-transitory machine readable media comprising a set of instructions that, when executed by one or more processors, perform a method of provisioning an unprovisioned resource in a unified communications system, the method comprising:

receiving, at a server, a request to initiate provisioning of the unprovisioned resource;

sending, by the server, provisioning data to the unprovisioned resource to enable a user perceptible presentation of a given provisioning object at the unprovisioned resource;

sending, by the server, user data to a registered client, corresponding to one of the plurality of resources registered to a respective user account, the user data enabling an interactive presentation of a plurality of provisioning objects with respect to the registered client, the plurality of provisioning objects including the given provisioning object;

receiving, by the server, selection data identifying one of the plurality of provisioning objects that has been selected in response to a user input at the registered client; and associating, by the server, the unprovisioned resource with the respective user account of the registered client; and initiating provisioning of the unprovisioned resource for operation within the communications system if the selection data identifies that the given provisioning object was selected in response to the user input at the registered client.

* * * * *